No. 705,426. Patented July 22, 1902.
O. A. MYGATT.
DISPLAY LIGHT.
(Application filed Mar. 7, 1901.)
(No Model.)
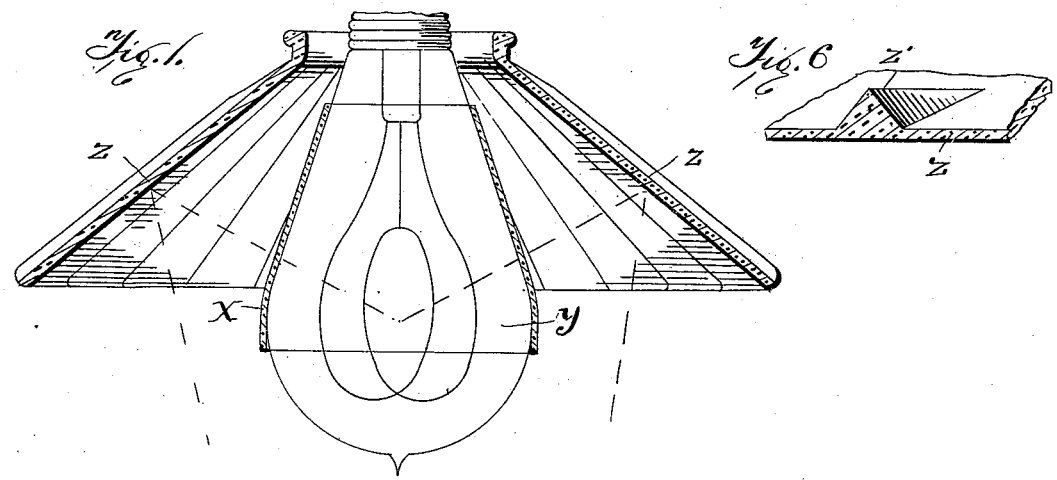
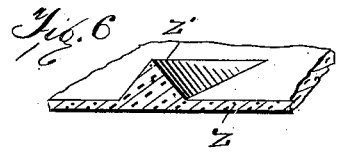
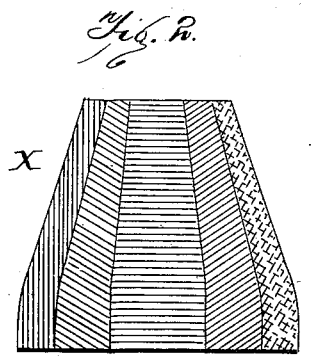
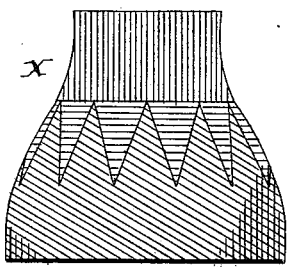
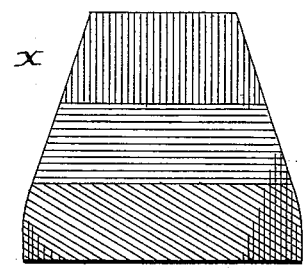
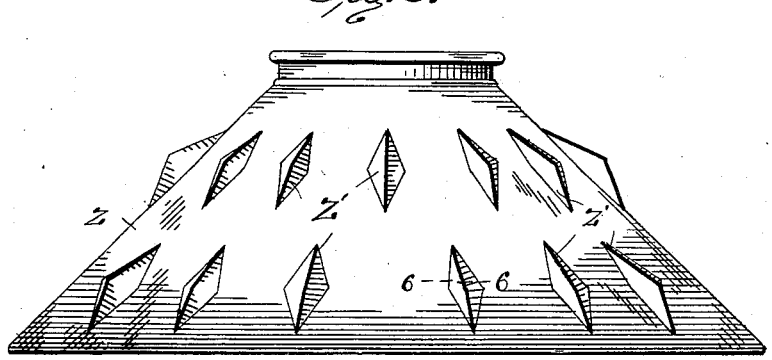
Witnesses
Chas. K. Davis.
Paul McFarland.
Inventor
O. A. Mygatt
By M. H. Bartlett
Attorney
THE NORRIS PETERS CO., PHOTO-LITHO., WASHINGTON, D. C.

UNITED STATES PATENT OFFICE.

OTIS A. MYGATT, OF NEW YORK, N. Y.

DISPLAY-LIGHT.

SPECIFICATION forming part of Letters Patent No. 705,426, dated July 22, 1902.

Application filed March 7, 1901. Serial No. 50,236. (No model.)

*To all whom it may concern:*

Be it known that I, OTIS A. MYGATT, residing at New York, in the county of New York and State of New York, have invented certain new and useful Improvements in Display-Lights, of which the following is a specification, reference being had therein to the accompanying drawings.

This invention relates to display-lights for decorative effects.

The object of the invention is to produce, by a combination of colored layers permeable to light and reflectors having a number of reflecting angles or facets, an iridescent light having a kaleidoscopic effect useful for decorative purposes.

Figure 1 is a section of an illuminator arranged according to my invention. Fig. 2 is a side elevation of a colored covering applicable to a lamp. Figs. 3 and 4 are similar views of modifications. Fig. 5 is an elevation of a transparent frustum having prismatic reflecting-surfaces. Fig. 6 is a broken sectional perspective of the same on lines 6 6, Fig. 5.

A truncated frustum of transparent glass having smooth inner surface and having facets of geometrical or other regular patterns pressed in or on the material of the glass and on the upper surface acts as a reflector by throwing back the light-rays from the inner faces of the projections, facets, or patterns on the glass. These must of necessity be at various angles to the source of light, and hence act as prisms to change direction of the light-rays reaching such surfaces from inside the frustum. Ribs or prisms pressed on the upper surface of the shade, so that rays passing through the glass will strike the inner surface of the outer facet at an angle of forty-five degrees, will cause the rays to be turned almost entirely at an angle of ninety degrees across the facet or rib. Here, again, the light-ray, if it encounters the inner plane of the facet at an angle of forty-five degrees, will be again deflected ninety degrees and thrown back in a line parallel with the original line of radiation. As much as eighty-five per cent. of the light may thus be reflected by ribs on the outer surface of transparent glass, leaving but about fifteen per cent. of the light to pass through the glass. The amount of light so reflected—that is, twice deflected ninety degrees—is much reduced, as the angle varies from forty-five degrees; but by covering the entire upper surface of a transparent shade with ribs or prisms arranged at the proper angle I am able to reflect or throw back nearly as much light as from a silvered mirror.

Let Z Z represent such a reflector placed in usual relation to an electric or similar lamp Y. Then over the lamp Y, I arrange a cup or cover of party-colored glass, as indicated at X. The colored cover X may have as many colors and may be arranged in as many patterns as desirable. The glass should be as transparent as may be consistent with maintaining its colors or tints.

Colored cups X may be made by painting with transparent colors on the bulb and then burning, or the stratum of colored glass may be applied to the surface of an ordinary lamp-bulb, or transparent colors may otherwise be applied, as in the glass of the lamp itself; but as cups are of slight cost it is better to have them made removable, when by changing the cups different decorative effects may be produced with the same light. The removable cups are made of thin glass of a form to fit neatly over the stem or upper part of an electric-lamp bulb. The removable cups are of frusto-conical or bell form, open at both top and bottom.

As the light from lamp Y passes through all parts of the cup X, it is evident that rays from more than one of the colored portions will be likely to strike the inclined reflecting-surfaces of the upper face of the reflector Z. As the angles of the reflecting-faces vary, the result is that the reflected light from these surfaces has a peculiar iridescent or prismatic rainbow effect.

If the cup X be made of glass of a single color or tint, the light passing through said cup will strike the inclined reflecting-surfaces at various angles and will still be deflected and an iridescent effect will be produced; but the prevailing color will be maintained, gradated into shades; but where a plurality of colors are used and more than one color is thrown onto an inclined illuminating-face the reflector produces a gradation of colors impossible to describe in words, but very rich in its decorative effect.

What I claim is—

1. The combination of a frustum of transparent glass having a smooth inner face and reflecting-facets on its outer face, an inner source of light, and an interposed colored stratum permeable to light, substantially as described.

2. The combination with a frustum of transparent glass having reflecting-facets on its outer face, of a light within said reflector, and an interposed stratum, permeable to light, and colored with a plurality of transparent colors.

3. The combination with a frustum of transparent glass having reflecting-facets on its outer face, of an inclosed artificial light, and a removable interposed cup of colored glass.

In testimony whereof I affix my signature in presence of two witnesses.

OTIS A. MYGATT.

Witnesses:
 W. A. BARTLETT,
 HARVEY T. WINFIELD.